United States Patent [19]
Otake et al.

[11] Patent Number: 5,948,476
[45] Date of Patent: Sep. 7, 1999

[54] METHOD AND APPARATUS FOR PRODUCING MOLECULAR FILM

[75] Inventors: Tadashi Otake, Osaka; Norihisa Mino, Nara; Tohru Nakagawa, Shiga; Mamoru Soga, Osaka; Kazufumi Ogawa, Nara; Takaiki Nomura; Yasuo Takebe, both of Osaka, all of Japan

[73] Assignee: Matsushita Electric Industrial Co., Ltd., Osaka, Japan

[21] Appl. No.: 08/964,471

[22] Filed: Nov. 4, 1997

[30] Foreign Application Priority Data

Nov. 8, 1996 [JP] Japan ..................... 8-296649

[51] Int. Cl.⁶ ........................... B05D 1/28
[52] U.S. Cl. .................. 427/352; 427/359; 427/377; 427/387; 427/388.1; 427/389.7
[58] Field of Search .................. 427/377, 352, 427/389.7, 388.1, 387, 359

[56] References Cited

U.S. PATENT DOCUMENTS

| | | | |
|---|---|---|---|
| 5,108,784 | 4/1992 | Anderson et al. | 427/96 |
| 5,505,997 | 4/1996 | Strong et al. | 427/348 |
| 5,512,131 | 4/1996 | Kumar et al. | 156/655.1 |

FOREIGN PATENT DOCUMENTS

| | | |
|---|---|---|
| 484746 | 5/1992 | European Pat. Off. . |
| 0 492 545 | 7/1992 | European Pat. Off. . |
| 0 498 335 | 8/1992 | European Pat. Off. . |
| 1-70917 | 3/1989 | Japan . |
| 3-94876 | 4/1991 | Japan . |
| 4-11971 | 1/1992 | Japan . |
| 6-244171 | 9/1994 | Japan . |
| WO 96/29629 | 9/1996 | WIPO . |

*Primary Examiner*—Erma Cameron
*Attorney, Agent, or Firm*—Merchant & Gould P.C.

[57] ABSTRACT

A method for forming a molecular film includes the steps of: coating a surface of a substrate having active hydrogen atoms on its surface with a coating solution containing a silane-based compound having at least one reactive group selected from the group consisting of a chloro group, an alkoxy group and an isocyanate group; and effecting an elimination reaction between the active hydrogen atoms on the surface of the substrate and reactive groups of the silane-based compound, thereby covalently bonding the silane-based compounds to the surface of the substrate. The substrate is supplied to a chamber in which an atmosphere is maintained at a low water vapor density. The surface of the substrate is coated with a coating solution containing the silane-based compound and a solvent by using a transfer element. A dehydrochlorination reaction is effected between the active hydrogen atoms and the chloro groups of the silane-based compounds. Thereafter, any coating solution containing unreacted silane-based compounds after coating is removed inside or outside the chamber.

10 Claims, 7 Drawing Sheets

METHOD AND APPARATUS FOR PRODUCING MOLECULAR FILM

FIELD OF THE INVENTION

The present invention relates to a method and an apparatus for producing a molecular film in which silane-based compounds are covalently bonded to a substrate surface via siloxane bonds.

BACKGROUND OF THE INVENTION

A method for producing a molecular film by coating the surface of a glass or the like having active hydrogen atoms on its surface with chlorosilane-based compounds having chlorosilyl groups at the end of the molecules comprising alkyl groups or fluoroalkyl groups so as to form covalent bonds by a dehydrochlorination reaction already has been proposed.

In the prior art, a substrate is dipped into a coating solution containing chlorosilane-based compounds to form a molecular film, as disclosed in Japanese Laid-Open Patent Publication No. 1-70917 and EP 0492545A. Another example of the proposed methods is to contact the chlorosilane-based compounds in a vapor phase onto the surface of a substrate for effecting a reaction.

However, the conventional dip method is excellent in the case where a film is to be formed not on a flat plate, but instead on a rough surface, because the liquid reacts along the rough surface, so that a film can be formed along the surface of the unusual shaped object. On the other hand, this method requires a large amount of the liquid for dipping and a troublesome operation of putting in and withdrawing the substrate, which takes a long time. Consequently, this method adversely results in a high cost. Furthermore, since the chlorosilane-based compounds readily react with water, the pot life is short. In addition, in the dip method, the chlorosilane-based compounds are in contact with the entire substrate and a reaction is effected all over the surface of the substrate. Therefore, this method is disadvantageous in the case where a prescribed portion is not desired to be coated with the chlorosilane-based compounds.

Furthermore, a method of contacting the chlorosilane-based compound in a vapor phase with the surface of the substrate for effecting a reaction is disadvantageous in that it is difficult to form a molecular film uniformly.

SUMMARY OF THE INVENTION

A method for forming a molecular film of the present invention includes the steps of: coating a surface of a substrate having active hydrogen atoms on its surface with a coating solution containing a silane-based compound having at least one reactive group selected from the group consisting of a chloro group, an alkoxy group and an isocyanate group; and effecting an elimination reaction between the active hydrogen atoms on the surface of the substrate and the reactive groups of the silane-based compounds, thereby covalently bonding the silane-based compounds to the surface of the substrate. The substrate is supplied to a chamber in which an atmosphere is maintained at a low water vapor density, the surface of the substrate is coated with a coating solution containing the silane-based compound and a solvent by using a transfer element. An elimination reaction is effected between the active hydrogen atoms and the reactive groups of the silane-based compounds. Thereafter, any coating solution containing unreacted silane-based compounds that remains after coating is removed inside or outside the chamber.

In the above mentioned step, in the case where a chlorosilane compound is used as the silane-based compound, a dehydrochlorination reaction is effected as the elimination reaction. In the case where an alkoxysilane compound is used, a dealcoholization reaction is effected.

In one embodiment according to the above-mentioned method of the present invention, the transfer element comprises an inner chamber enclosing at least a portion where a coating solution is present in the transfer element. In this manner, hydrolysis of the silane-based compound in the coating solution can be prevented.

In another embodiment according to the above-mentioned method of the present invention, air curtains for shutting off outside air are provided at an inlet and an outlet of the chamber through which the substrate is introduced and withdrawn, respectively. In this manner, hydrolysis of the silane-based compound in the coating solution can further be prevented.

In still another embodiment according to the above-mentioned method of the present invention, the transfer element performs at least the steps of applying the coating solution onto a support, and transferring the solution applied to the support to the substrate on which a film is to be formed. In this manner, the substrate can be uniformly coated with the coating solution.

In yet another embodiment according to the above-mentioned method of the present invention, the transfer element is a roller coating element. This is most inexpensive. Furthermore, this method makes it possible to deal with a wide substrate having, for example, 1 to 10 m.

In another embodiment according to the above-mentioned method of the present invention, the silane-based compound comprises an alkyl group or a fluoroalkyl group. In particular, it is preferable to comprise an fluoroalkyl group, because a water-repelling property, an oil-repelling property and an antifouling property are improved.

In still another embodiment according to the above-mentioned method of the present invention, the solvent contains no active hydrogen atoms. This is preferable because a solvent having active hydrogen atoms reacts with the silane-based compound.

In yet another embodiment according to the above-mentioned method of the present invention, the solvent containing no active hydrogen atoms is at least one selected from the group consisting of a hydrocarbon compound, a siloxane-based compound and hydrocarbon halide.

In another embodiment according to the above-mentioned method of the present invention, the mixing ratio of the silane-based compound to the solvent in the coating solution is such that the silane-based compound is present at an amount of 0.05 to 20% by weight, and the kinematic viscosity of the coating solution is 0.5 to 5000 cst (at 25° C.).

In still another embodiment according to the above-mentioned method of the present invention, the substrate is a glass sheet, and a face other than a face that is to be coated with the coating solution is masked with a resin film prior to coating. This is preferable because masking perfectly protects the surface which is not to be coated, although the surface which is not to be coated hardly reacts with the silane-based compound.

According to another aspect of the present invention, an apparatus for forming a molecular film includes a chamber including an element for transporting a substrate from an inlet to an outlet, a transfer element for coating a surface of the substrate with a coating solution containing silane-based compounds and a solvent, and an element for maintaining the atmosphere in the chamber at a low water vapor density. The apparatus further includes an element for removing any remaining coating solution containing unreacted silane-based compounds after the process of coating inside or outside the chamber.

In one embodiment according to the above-mentioned apparatus of the present invention further includes an inner chamber enclosing at least a portion where a coating solution is present in the transfer element.

In another embodiment according to the above-mentioned apparatus of the present invention, air curtains for shutting off outside air are provided at the inlet and the outlet of the chamber through which the substrate is introduced and withdrawn, respectively.

In still another embodiment according to the above-mentioned apparatus of the present invention, the element for maintaining the atmosphere at a low water vapor density is an element for introducing a gas having a water vapor density in the range from 0 to 0.0076 kg/m$^3$.

In yet another embodiment according to the above-mentioned apparatus of the present invention, the transfer element performs at least the steps of applying the coating solution onto a support, and transferring the solution applied to the support to the substrate on which a film is to be formed.

In another embodiment according to the above-mentioned apparatus of the present invention, the transfer element is a roller coating element.

In still another embodiment according to the above-mentioned apparatus of the present invention, the apparatus further includes an element for supplying a gas having a low water vapor density in the inner chamber.

In yet another embodiment according to the above-mentioned apparatus of the present invention, the coating solution is applied to the support by attaching the solution onto the surface of the substrate by dropping the solution onto the support, dipping the support in the solution, or contacting the solution, or a vapor or spray of the solution with the support.

In another embodiment according to the above-mentioned apparatus of the present invention, the roller coating element includes at least a doctor roll for developing the coating solution, a coating roll for coating the substrate with the coating solution to a uniform thickness, and a backup roll for pressing the substrate from the lower face of the substrate.

In still another embodiment according to the above-mentioned apparatus of the present invention, the portion in the vicinity of the rolls where the water vapor density is controlled to be within the prescribed range is a space containing at least a portion where the solution is attached to or stays on the surface of the rolls.

In yet another embodiment according to the above-mentioned apparatus of the present invention, the element for removing any remaining solution containing unreacted silane-based compounds from the surface of the substrate is at least one selected from the group consisting of elements for removing by blowing a gas for evaporation, by heating for evaporation, by decompressing for evaporation, by blowing away with a gas, and by washing away with a liquid.

Thus, the invention described herein makes possible the advantage of providing a method and an apparatus for producing a molecular film needing only a small amount of liquid to form a film, being capable of disregarding the pot life of a coating solution, facilitating the operation of handling the substrate and reducing the cost as a whole.

These and other advantages of the present invention will become apparent to those skilled in the art upon reading and understanding the following detailed description with reference to the accompanying figures.

DESCRIPTION OF THE PREFERRED EMBODIMENTS

Figure 1:
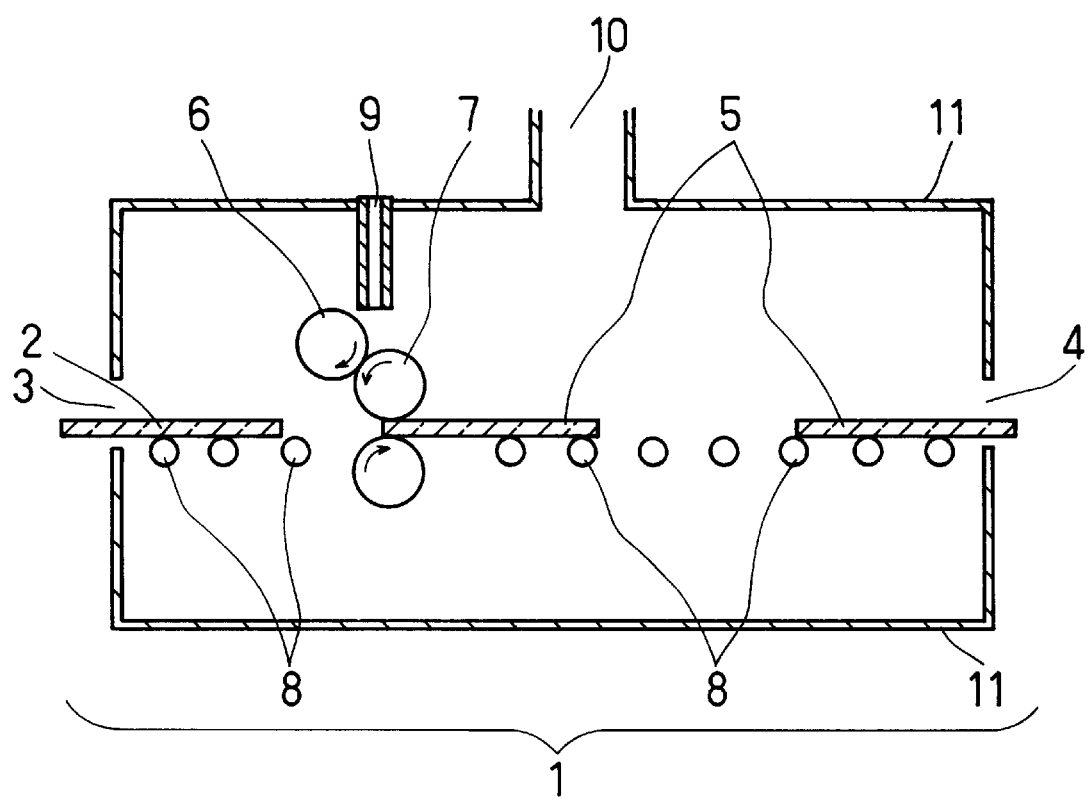
FIG. 1 is a schematic view showing the structure of a roller coat film-forming apparatus of an apparatus for producing a molecular film of one example according to the present invention.

According to the present invention, a molecular film having a thickness in the range from about 0. nm to about 1 μm can be formed on a substrate by forming siloxane bonds between the substrate and silane-based compounds.

It is preferable that the silane-based compound be a compound comprising an alkyl group or a fluoroalkyl group. A specific example of the compound comprising a fluoroalkyl group includes a fluoroalkylsilane compound expressed by a general formula $C_nF_{2n+1}(CH_2)_2SiCl_3$ (n=a positive integer of 1 to 30), such as heptadecafluoro1,1,2,2,tetrahydrodecyl-trichlorosilane or the like.

As a solvent for dissolving the chlorosilane-based compound, any solvent can be used, as long as it does not contain active hydrogen atoms that react with the chlorosilane-based compound. For example, a hydrocarbon-based solvent, a hydrocarbon halide-based solvent, an alkylsiloxane-based solvent, or a silicone oil-based solvent can be used for the fluoroalkylsilane compound. Specific examples of the hydrocarbon-based solvent include a solvent of oils expressed by a general formula $C_nH_{2n+2}$ (n=a positive integer) such as a turpentine oil or the like, or expressed by a general formula $C_nH_{2n}$. Specific examples of the hydrocarbon halide-based solvent include a solvent expressed by a general formula $C_nH_{2n-m+2}X_m$ (n=a positive integer, m=an integer, and X=halogen) such as octadecafluorooctane or the like. Specific examples of the alkylsiloxane-based solvent include a linear silicone solvent expressed by a general formula $R^1(R^2R^3SiO)_nR^4$ (n=a positive integer, $R^1$, $R^2$, $R^3$, and $R^4$=alkyl groups) such as hexamethyldisiloxane or the like, or a cyclic silicone solvent expressed by a general formula $(R^1R^2SiO)_n$ (n=a positive integer, $R^1$ and $R^2$=alkyl groups) such as octamethylsiloxane, or a mixture thereof.

Examples of a method for applying the solution containing the chlorosilane-based compound to the surface of a substrate include a roller coating method, a pad printing method or the like. In these methods, it is preferable that a portion of the apparatus where the solution is present such as a roll, a pad or a substrate be maintained at a water vapor density as low as 0 kg/m$^3$ to 0.0076 kg/m$^3$.

Examples of a chemical absorbent that can be used in the present invention are listed below:

(1) $CH_3(CH_2)_rSiX_pCl_{3-p}$
(2) $CH_3(CH_2)_sO(CH_2)_tSiX_pCl_{3-p}$
(3) $CH_3(CH_2)_u-Si(CH_3)_2(CH_2)_v-SiX_pCl_{3-p}$
(4) $CF_3COO(CH_2)_wSiX_pCl_{3-p}$ (where p is an integer of 0 to 2, r is an integer of 1 to 25, s is an integer of 0 to 12, t is an integer of 1 to 20, u is an integer of 0 to 12, v is an integer of 1 to 20, and w is an integer of 1 to 25. X is a hydrogen, an alkyl group, an alkoxyl group, a fluorine containing alkyl group, or a fluorine containing alkoxyl group.)

Furthermore, specific examples of the absorbent are the following compounds:

(5) $CH_3CH_2O(CH_2)_{15}SiCl_3$
(6) $CH_3(CH_2)_2Si(CH_3)_2(CH_2)_{15}SiCl_3$
(7) $CH_3(CH_2)_6Si(CH_3)_2(CH_2)_9SiCl_3$
(8) $CH_3COO(CH_2)_{15}SiCl_3$
(9) $CF_3(CF_2)_7-(CH_2)_2-SiCl_3$
(10) $CF_3(CF_2)_5-(CH_2)_2-SiCl_3$
(11) $CF_3(CF_2)_7-C_6H_4-SiCl_3$

Furthermore, instead of the chlorosilane-based chemical absorbent as described above, an isocyanate-based chemical absorbent obtained by substituting all of the chlorosilyl groups with isocyanate groups can be used. Examples thereof are as follows:

(12) $CH_3-(CH_2)_rSiX_p(NCO)_{3-p}$
(13) $CF_3-(CH_2)_rSiX_p(NCO)_{3-p}$
(14) $CH_3(CH_2)_sO(CH_2)_tSiX_p(NCO)_{3-p}$
(15) $CH_3(CH_2)_u-Si(CH_3)_2(CH_2)_v-SiX_p(NCO)_{3-p}$
(16) $CF_3COO(CH_2)_wSiX_p(NCO)_{3-p}$ (where, p, r, s, t, u, v, w and X are the same as above.)

Instead of the above-mentioned absorbents, the absorbent compounds specifically listed below can be used.

(17) $CH_3CH_2O(CH_2)_{15}Si(NCO)_3$
(18) $CH_3(CH_2)_2Si(CH_3)_2(CH_2)_{15}Si(NCO)_3$
(19) $CH_3(CH_2)_6Si(CH_3)_2(CH_2)_9Si(NCO)_3$
(20) $CH_3COO(CH_2)_{15}Si(NCO)_3$
(21) $CF_3(CF_2)_7-(CH_2)_2-Si(NCO)_3$
(22) $CF_3(CF_2)_5-(CH_2)_2-Si(NCO)_3$
(23) $CF_3(CF_2)_7-C_6H_4-Si(NCO)_3$

Furthermore, as the chemical absorbent, in general, a substance expressed by a formula $SiX_k(OA)_{4-k}$ (X is the same as above, A is an alkyl group, and k is 0, 1, 2, or 3) can be used. In particular, when a substance expressed by $CF_3-(CF_2)_n-(R)_q-SiX_p(OA)_{3-p}$ (n is a positive integer of 1 or more, preferably an integer of 1 to 22, R is an alkyl group, a vinyl group, an ethynyl group, an aryl group, silicon or substituent containing an oxygen atom, q is 0 or 1, and X, A, and p are the same as above) is used, a film having a more excellent antifouling property can be used. However, it is not limited thereto. Other examples are $CH_3-(CH_2)_r-SiX_p(OA)_{3-p}$ and $CH_3-(CH_2)_s-O-(CH_2)_t-SiX_p(OA)_{3-p}$, $CH_3-(CH_2)_u-Si(CH_3)_2-(CH_2)_v-SiX_p(OA)_{3-p}$, $CF_3COO-(CH_2)_w-SiX_p(OA)_{3-p}$, (where, p, r, s, t, u, v, w, X and A are the same as above.)

Furthermore, more specific examples of the chemical absorbent are as follows:

(24) $CH_3CH_2O(CH_2)_{15}Si(OCH_3)_3$
(25) $CF_3CH_2O(CH_2)_{15}Si(OCH_3)_3$
(26) $CH_3(CH_2)_2Si(CH_3)_2(CH_2)_{15}Si(OCH_3)_3$
(27) $CH_3(CH_2)_6Si(CH_3)_2 (CH_2)_9Si(OCH_3)_3$
(28) $CH_3COO(CH_2)_{15}Si(OCH_3)_3$
(29) $CF_3(CF_2)_5(CH_2)_2Si(OCH_3)_3$
(30) $CF_3(CF_2)_7-C_6H_4-Si(OCH_3)_3$
(31) $CH_3CH_2O(CH_2)_{15}Si(OC_2H_5)_3$
(32) $CH_3(CH_2)_2Si(CH_3)_2(CH_2)_{15}Si(OC_2H_5)_3$
(33) $CH_3(CH_2)_6Si(CH_3)_2(CH_2)_9Si(OC_2H_5)_3$
(34) $CF_3(CH_2)_6Si(CH_3)_2(CH_2)_9Si(OC_2H_5)_3$
(35) $CH_3COO(CH_2)_{15}Si(OC_2H_5)_3$
(36) $CH_3COO(CH_2)_{15}Si(OC_2H_5)_3$
(37) $CF_3COO(CH_2)_{15}Si(OCH_3)_3$
(38) $CF_3(CF_2)_9(CH_2)_2Si(OC_2H_5)_3$
(39) $CF_3(CF_2)_7(CH_2)_2Si(OC_2H_5)_3$
(40) $CF_3(CF_2)_5(CH_2)_2Si(OC_2H_5)_3$
(41) $CF_3(CF_2)_7C_6H_4Si(OC_2H_5)_3$
(42) $CF_3(CF_2)_9(CH_2)_2Si(OCH_3)_3$
(43) $CF_3(CF_2)_5(CH_2)_2Si(OCH_3)_3$
(44) $CF_3(CF_2)_7(CH_2)_2SiCH_3(OC_2H_5)_2$
(45) $CF_3(CF_2)_7(CH_2)_2SiCH_3(OCH_3)_2$
(46) $CF_3(CF_2)_7(CH_2)_2Si(CH_3)_2OC_2H_5$
(47) $CF_3(CF_2)_7(CH_2)_2Si(CH_3)_2OCH_3$

EXAMPLES

Hereinafter, the present invention will be specifically described by way of examples with reference to the accompanying drawings.

Example 1

In this example, a method and an apparatus for producing a molecular film will be described by taking as an example a roller coat film-forming apparatus, which is one of the apparatus for producing a film in accordance with the method for producing a film of the present invention. In addition, other methods also will be referred to, if necessary.

FIG. 1 is a schematic view showing the structure of a roller coat film-forming apparatus, which is one of the apparatus for producing a film in accordance with the method for producing a film of the present invention. This roller coat film-forming apparatus 1 has the structure in which a substrate 2 is introduced from an inlet 3 to a chamber 11 and a substrate having a film formed thereon 5 exits from an outlet 4. Inside the apparatus is provided a doctor roll 6, a coating roll 7, a transporting roll 8, a nozzle 9 for dropping a chlorosilane-based solution, a nozzle 10 for supplying a gas having a prescribed water vapor density (a dry nitrogen gas), and a chamber 11 for maintaining the atmosphere at the prescribed water vapor density.

In the nozzle 9 for dropping a solution based on chlorosilane, a bottle for storing the chlorosilane solution, a pump and a pipe for supplying the chlorosilane solution, a bottle for collecting waste liquid, a receiving member and a pipe for collecting waste liquid are provided. For the sake of simplicity, these members are not shown in FIG. 1.

In the roller coat film-forming apparatus, the coating roll 7 is in contact with or pressed onto the doctor roll 6, and a solution containing chlorosilane-based compounds and a solvent is supplied to the contact portion of the two rolls. By rotating the coating roll 7, the solution is applied to the cylindrical surface of the coating roll 7. Then, the coating roll 7 is rotated in contact with or pressed onto the surface of the substrate 2, so that the solution on the cylindrical surface of the coating roll is transferred to the surface of the substrate. The substrate coated with the solution is transported to the outlet 4 of the roller coat film-forming apparatus by the transporting roll 8. During this period, a gas (dry nitrogen gas) having a water vapor density maintained at the prescribed level is continuously supplied so that the solution or the solvent which has not contributed to the film-forming can be removed by natural evaporation.

Figure 2:
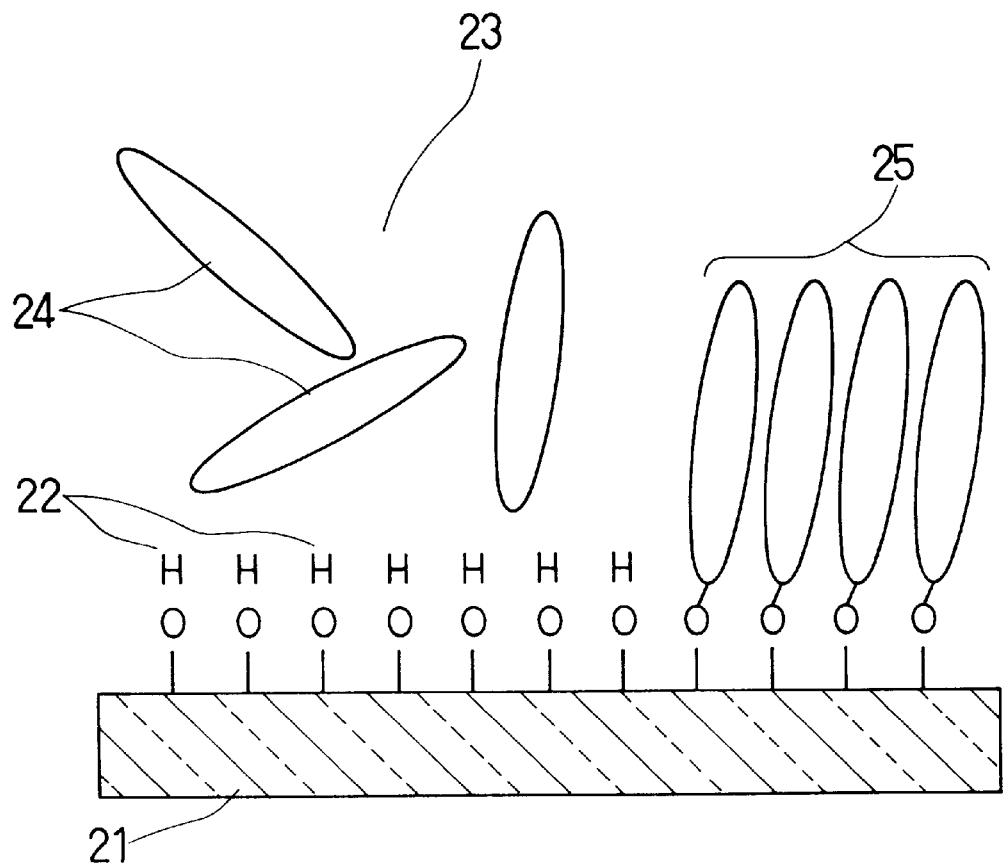
FIG. 2 is a schematic view showing the surface of a substrate when the surface of the substrate is coated with a solution.

In the operation described above, the reaction effected on the substrate will be described below. As the chlorosilane-based compound, heptadecafluoro1,1,2,2,tetrahydrodecyltrichlorosilane is used, and octamethylcyclotetrasiloxane is used as the solvent. The concentration of the chlorosilane-based compound of the solution is 1 vol. %. The nozzle 9 is provided above the contact point of the coating roll 7 and the doctor roll 6, and the solution is dropped from the nozzle 9. Thus, by rotating the coating roll, the solution is applied uniformly onto the cylindrical surface of the coating roll. The space surrounding the solution, namely, the portion where the doctor roll, the coating roll and the nozzle are present, is covered with a cover and supplied with a dry nitrogen gas. At this point, the water vapor density in the space is 0.0075 kg/m$^3$. By maintaining this water vapor density at this level, it is possible to prevent chlorosilyl groups in the heptadecafluoro1,1,2,2,tetrahydrodecyltrichlorosilane from being hydrolyzed by water, and it is also possible to remove moisture on the surfaces of the coating roll and the doctor roll and to prevent the moisture from being attached to the surfaces thereof. Furthermore, it is possible to remove undesired moisture on the surfaces of the introduced substrate and to prevent moisture from being attached to the surface thereof. In such a structure, the substrate is coated with the solution applied to the cylindrical surface of the coating roll by allowing the coating roll to be in contact with or pressed onto the introduced substrate. FIG. 2 shows the surface of the substrate in this stage. Groups having active hydrogen atoms (hydroxyl groups 22 in FIG. 2) are present on the surface of the substrate 21. A dehydrochlorination reaction is effected between the hydroxyl groups and a solute, e.g., heptadecafluoro1,1,2,2,tetrahydrodecyltrichlorosilane (simply shown by ellipses in FIG. 2) 24 in the coated solution 23, and then a thin film 25 is formed of siloxane bonds to the surface of the substrate. Thereafter, in the case where solution that did not participate in the reaction is present on the substrate, the solution containing the solute is removed from the surface of the substrate. In the case where the solute reacted entirely, the solvent is removed from the surface of the substrate. The state shown herein is only one example for illustrating the present invention, and the present invention is not limited thereto. A different alignment and orientation is possible. A thicker film than in this example may be formed. In addition, it is believed that the reaction does not proceed from one side, as shown in FIG. 2, but the reaction for forming a film is effected simultaneously in several portions on the substrate.

Figure 3:
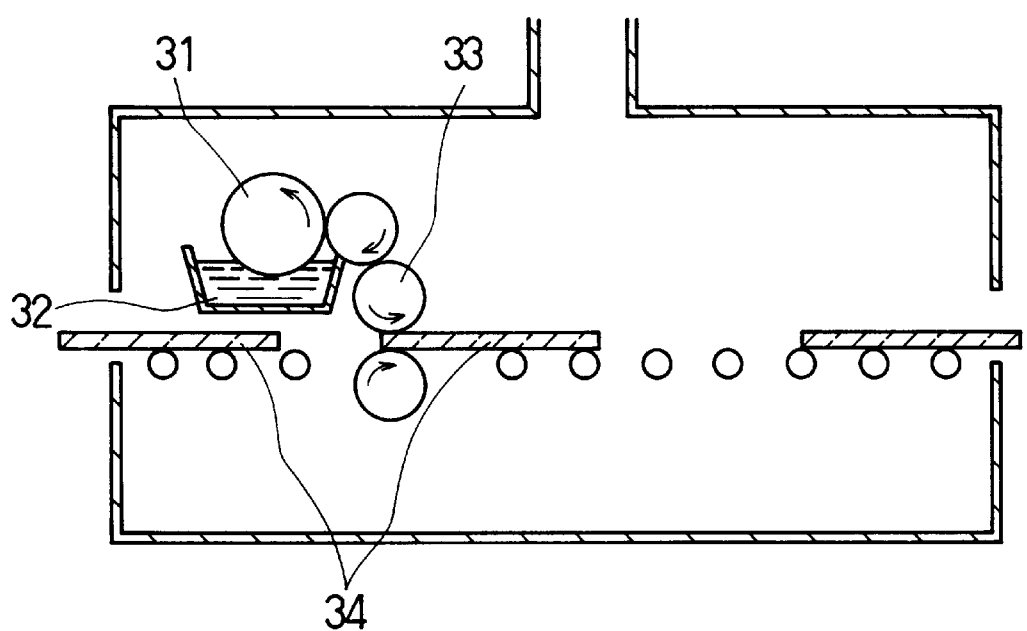
FIG. 3 is a schematic view showing an example of coating a substrate with a solution in a form different from that in FIG. 1.

Now, another example of applying the solution to the substrate is shown in FIG. 3. In FIG. 1, the solution containing the chlorosilane-based compound and the solvent is dropped by the nozzle 9. In this example, a dipping roll 31 is provided, and the dipping roll 31 is dipped in the solution 32 in a container such as a vat or the like. This operation allows the cylindrical surface and the internal portion of the dipping roll to be impregnated with the solution. The dipping roll is allowed to be in contact with the coating roll 33 so that the solution can be transferred onto the cylindrical surface of the coating roll and further the surface of the substrate 34, as in the example of FIG. 1. In this manner, a film is formed.

Figure 4:
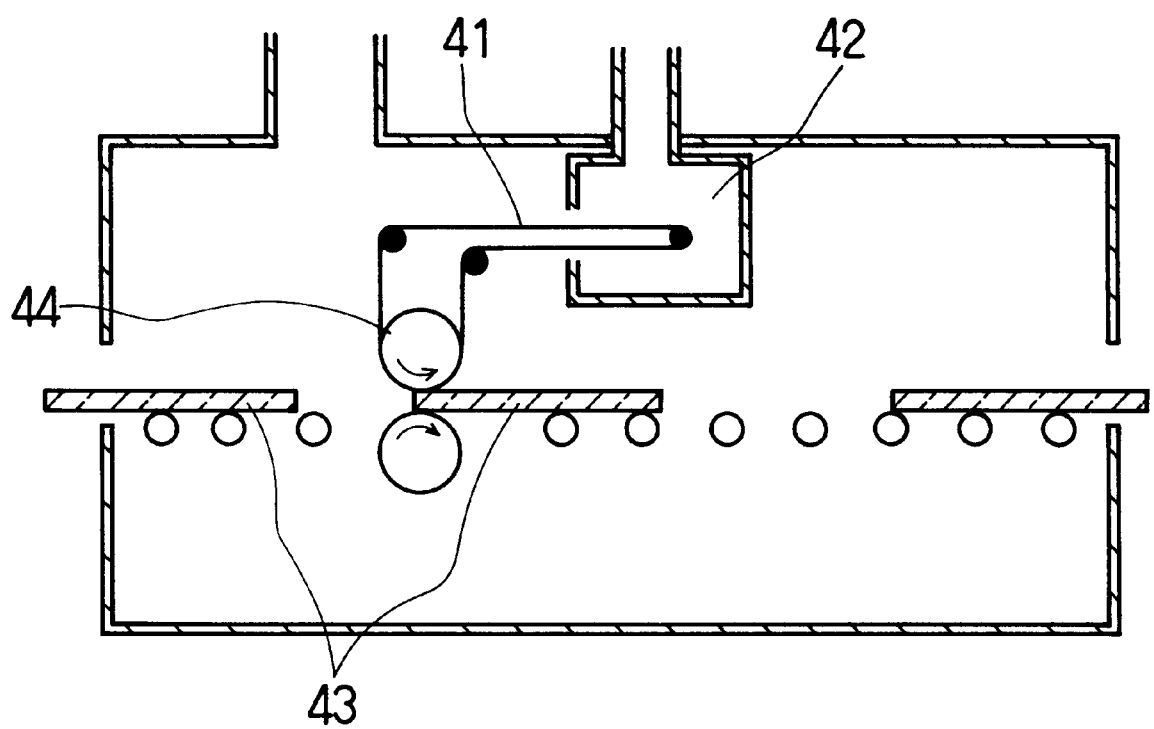
FIG. 4 is a schematic view showing an example of coating a substrate with a solution using a fabric.

FIG. 4 shows another form of coating the solution using a fabric instead of the rolls as shown in FIGS. 1 and 3. An endless band 41 is provided using a guide, as shown in FIG. 4. A suitable example of this band is a band made of rubber, a fabric band having an impregnation property, or the like. Apart of the band passes through a cloud chamber 42 containing the solution, and then the band is allowed to be in contact with the surface of the substrate 43 by a roll 44 so that the surface of the substrate can be coated with the solution applied to the band. Thereafter, the same processes as described referring to FIG. 1 are performed.

The solution coated onto the surface of the substrate forms a film through the reaction as shown in FIG. 2. In the example of FIG. 1, the solution or the solvent which did not contribute to the film formation evaporates naturally on the transporting roll. In the case where the water vapor density on the transporting roll exceeds the prescribed value, the chlorosilane-based compounds on the surface of the substrate not only react with hydroxyl groups on the surface of the substrate so as to form a film, but also react with each other, and are polymerized by a chain reaction. In order to prevent the polymerization, it is necessary to maintain the water vapor density at the prescribed value or less. Other methods than natural evaporation while maintaining the prescribed water vapor density or smaller are as follows: a method of spraying a dry nitrogen gas which has been heated at the prescribed water vapor density or less; a method for spraying a solution which is dissolved in the coating solution readily and is dried readily in the manner like a shower; a method of facilitating drying by putting the substrate under a reduced pressure on the way to the outlet; or a method of drying by providing a high pressure stream of a dry gas at the outlet (referred to as air knife). The method of providing a high pressure stream of a dry gas at the outlet (air knife) is effective for maintaining the atmosphere at the prescribed water vapor density as well as for drying the surface of the substrate. For this purpose, the high pressure stream of a dry gas is preferably provided not only at the outlet, but also at the inlet.

Comparative Example 1

In order to confirm the effect of the production method of the present invention, a film having siloxane bonds is produced in a conventional method. The importance of maintaining the water vapor density at a low level has been described in Example 1. The case where the water vapor density is not maintained at a low level also will be shown in this comparative example. Herein, a comparison is made in terms of the cost by taking a conventional dip method as an example.

Heptadecafluoro1,1,2,2,tetrahydrodecyltrichlorosilane is used as the chlorosilane-based compound, and octamethylcyclotetrasiloxane is used as the solvent, as used in Example 1. A 1 vol. % solution is prepared in a vat. The atmosphere surrounding the vat containing the solution is maintained at the above-mentioned water vapor density, and a glass plate of A4 size is dipped in the solution in the vat for 15 minutes. Thereafter, the solvent is dried naturally for 15 minutes.

A water droplet is dropped onto the surface of the glass plate on which a film is formed, and the state of the surface is evaluated by an angle formed by the water droplet and the glass plate (contact angle).

The results of the comparison between Example 1 and Comparative Example 1 are shown in Table 1.

TABLE 1

| Comparison Items | Method of Example 1 (Roll-coating method) | Conventional method (Comparative Ex. 1) (Dip method) |
|---|---|---|
| Contact angle | 112° | 112° |
| Appearance observation | No attachment | Opaque substance attached |

TABLE 1-continued

| Comparison Items | Method of Example 1 (Roll-coating method) | Conventional method (Comparative Ex. 1) (Dip method) |
|---|---|---|
| Prepared liquid amount | 0.4 g | 200 g |
| Film-forming time | 15 seconds | 1800 seconds |

Table 1 shows the results of the comparison regarding the contact angle, the appearance observation, the prepared liquid amount, and the film-forming time between a glass plate of A4 size having a film formed thereon by the method shown in Example 1 and a glass plate of A4 size having a film formed thereon by the method shown in Comparative Example 1. The contact angles of the obtained films are both 112°. This means that the surface states are the same. On the other hand, in the appearance observation, since the water vapor density is not maintained within the prescribed range after dipping, a large amount of opaque substances are attached onto the surface of the glass plate in the conventional method, whereas according to the method of the present invention, there is no attachment.

Furthermore, according to the method of the present invention, the solution of the chlorosilane-based compound is used in an amount of 0.4 g for one glass plate. On the other hand, the conventional method requires 200g, which is 500 times more, because the solution is prepared in a sufficient amount to dip the entire glass plate of A4 size. The solution in the conventional method can be used for another substrate to be dipped in after the first one is dipped, because the solution contains a sufficient amount of chlorosilane-based compounds so as to form films. Thus, films can be formed on a plurality of substrates, though it is not certain that as many as 500 films can be formed. Nevertheless, according to the method of the present invention, every time a film is to be formed, an appropriate amount of solution can be used for forming a film. In the conventional dip method, even if a film is to be formed on only one substrate, it is necessary to prepare a solution in an amount of 200 g, as shown in this comparative example. Therefore, the method of the present invention is advantageous for forming a film in accordance with the requirements at the time of the production. Accordingly, the cost required for forming a film can be reduced. Furthermore, the method of the present invention is advantageous in view of the keeping quality of the solution or the like.

Next, a clear difference is seen in the film-forming time. In Example 1 of the present invention, a film is formed on one glass plate for 15 seconds, and the film is defect-free in the appearance observation. On the other hand, the conventional dip method requires 1800 seconds, which is 120 times longer, and the quality of the product is not satisfactory. In this point as well as, there is a significant difference in the number of films that can be formed in a predetermined time. This demonstrates that the method of the present invention is advantageous for reducing the cost.

Another difference between the method of the present invention and the conventional dip method is that a film is formed on one face of the substrate according to the method of the present invention, while a film is formed on both faces of the substrate in the conventional method. In the case where a film is to be formed on only one face of the substrate in the conventional method, it is necessary to previously cover the face on which a film is not supposed to be formed with some element so that the reaction for forming a film cannot be effected. Furthermore, since an unnecessary film is formed on the face on which a film is not supposed to be formed in the conventional method, the cost for forming a film is twice the cost of the film formed according to the method of the present invention.

Example 2

Figure 5:
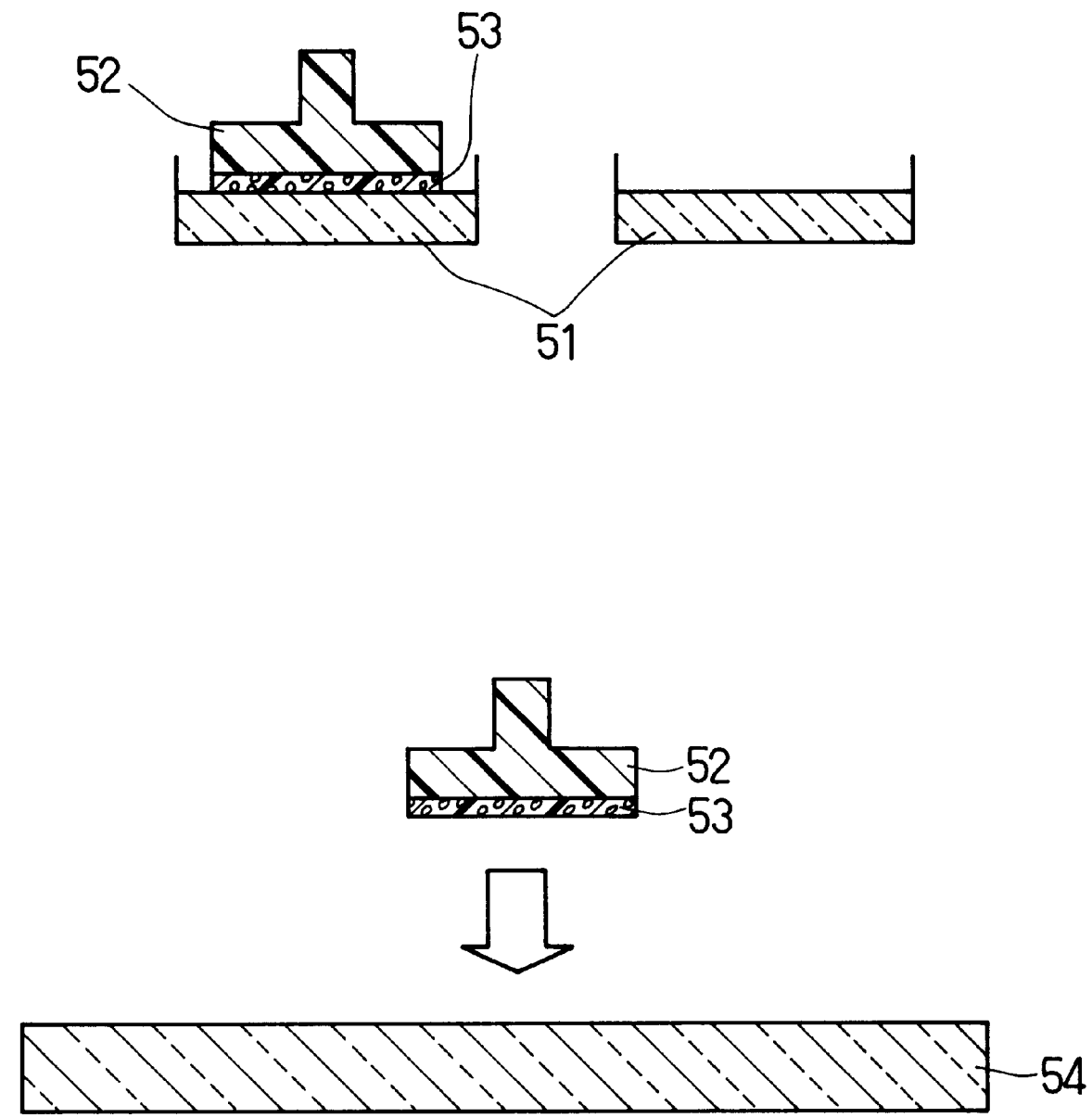
FIG. 5 is a schematic view showing a pad printing system.

This example shows a pad printing method. FIG. 5 is a schematic view of a pad printing system. Normal decyltrichlorosilane and heptadecafluoro1,1,2,2,tetrahydrodecyltrichlorosilane are used as the chlorosilane-based compounds. As the solvent, perfluorooctane is used. The solution concentration of each chlorosilane-based compound is 0.1 vol. %. A glass container 51 containing the solution is provided in the chamber in which the water vapor density is maintained at 0.0071 kg/m$^3$. A stamp-like pad tool 52 is used for the pad printing, and a rubber member 53 is attached to the pad printing face thereof The size of the rubber member is 30 mm×50 mm. This rubber face is dipped in the solution containing normal decyltrichlorosilane. The rubber member can be a support for transferring the solution to the substrate. Next, the rubber face is pressed onto a glass plate of A4 size 54 (as shown by the arrow in FIG. 5), so as to apply the solution to the glass plate surface. Then, the glass plate is allowed to stand until the solvent is dried naturally from the glass plate surface. Similarly, the surface of a glass plate is coated with a heptadecafluoro1,1,2,2, tetrahydrodecyltrichlorosilane solution using another pad tool, and the glass plate is allowed to stand until the solvent is dried naturally. These processes are performed in a chamber with a water vapor density of 0.0071 kg/m$^3$ maintained by a dry air. The glass plates having been subjected to the above-mentioned processes are taken out from the chamber in which the water vapor density is controlled, and the contact angles are measured with water droplets in the same manner as described above.

The contact angle in the portion where a film made of normal decyltrichlorosilane is formed is 100°, while the contact angle in the portion where a film made of heptadecafluoro1, 1,2,2,tetrahydrodecyltrichlorosilane is formed is 111°. This difference in the contact angles is due to the materials. On the other hand, the contact angle in the portion where a film is not formed is 30° or less. Furthermore, when the glass plate on which a film is formed by the pad printing method is immersed in water, and withdrawn from the water, the portion where a film is formed in a shape of 30 mm×50 mm repels water and the portion where the film is not formed gets wet. Thus, using the pad printing method, a film can be formed only in the portion where a film is required to be formed, and a glass substrate having a different state from that obtained by the roller coat method described in Example 1 can be obtained.

Example 3

In all the above-described examples, the supports were solid. The case where the support is liquid will be described in this example.

Figure 6:
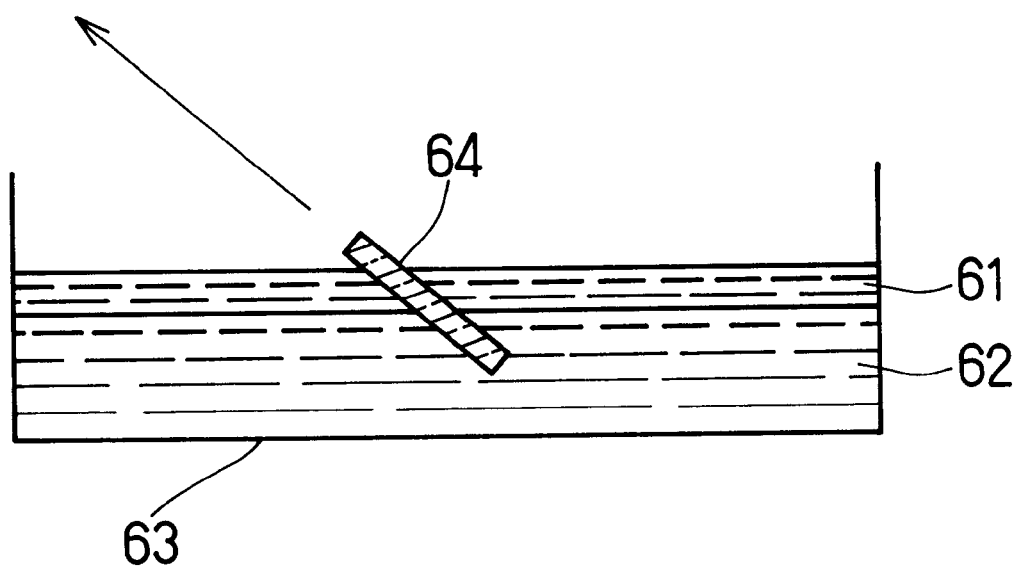
FIG. 6 is a schematic view showing a process in which a liquid is used as a support.

FIG. 6 is a schematic view showing processes where the support is liquid. Normal octadecyltrichlorosilane is used as the chlorosilane-based compound, and a linear silicone oil mixture (straight dimethyl silicone oil manufactured by Toray-Dow Corning Silicone Co., Ltd.) is used as the solvent. Thus, a solution 61 having a concentration of 0.1 vol. % is prepared. For the support, a liquid incompatible with the linear silicone oil mixture and normal octadecyltrichlorosilane is required. In this example, a liquid based on fluorine 62 (Fluorinert (trademark) manufactured by Sumitomo 3M Limited) is used. A square vat 63 of 15 cm×15 cm is provided in a closed space having a water vapor density of 0.0063 kg/m³ maintained. The liquid based on fluorine is poured into the vat to a sufficient level, and the solution containing the normal octadecyltrichlorosilane and the linear silicone oil mixture is quietly dropped in an amount of about 10 ml.

The solution is dropped uniformly onto the liquid based on fluorine. A silicon substrate 64 having a diameter of 3 inches is dipped in the vat, and is withdrawn immediately (in the direction shown by the arrow in FIG. 6), and is dried until the solvent evaporates. Thus, a film formed of normal octadecyltrichlorosilane is formed on the silicon substrate.

In the above examples, the glass substrate and the silicon substrate are used. However, any material can be used, as long as the material has active hydrogen atoms on its surface. A metal, a metal oxide, ceramics, plastics or the like that satisfy the above mentioned requirement are effective.

Furthermore, in this example, a gas supply nozzle for maintaining the water vapor density at a prescribed 0 to 0.0076 kg/m³ is shown. However, other methods can be used, as long as the water vapor density is controlled to be at the prescribed level, for example, by the provision of a moisture absorbing apparatus, without supplying a gas as in this example. Furthermore, in the case of the gas supply system or the like, it may be necessary to provide an exhauster. In this example, such a device is omitted.

Example 4

Figure 7:
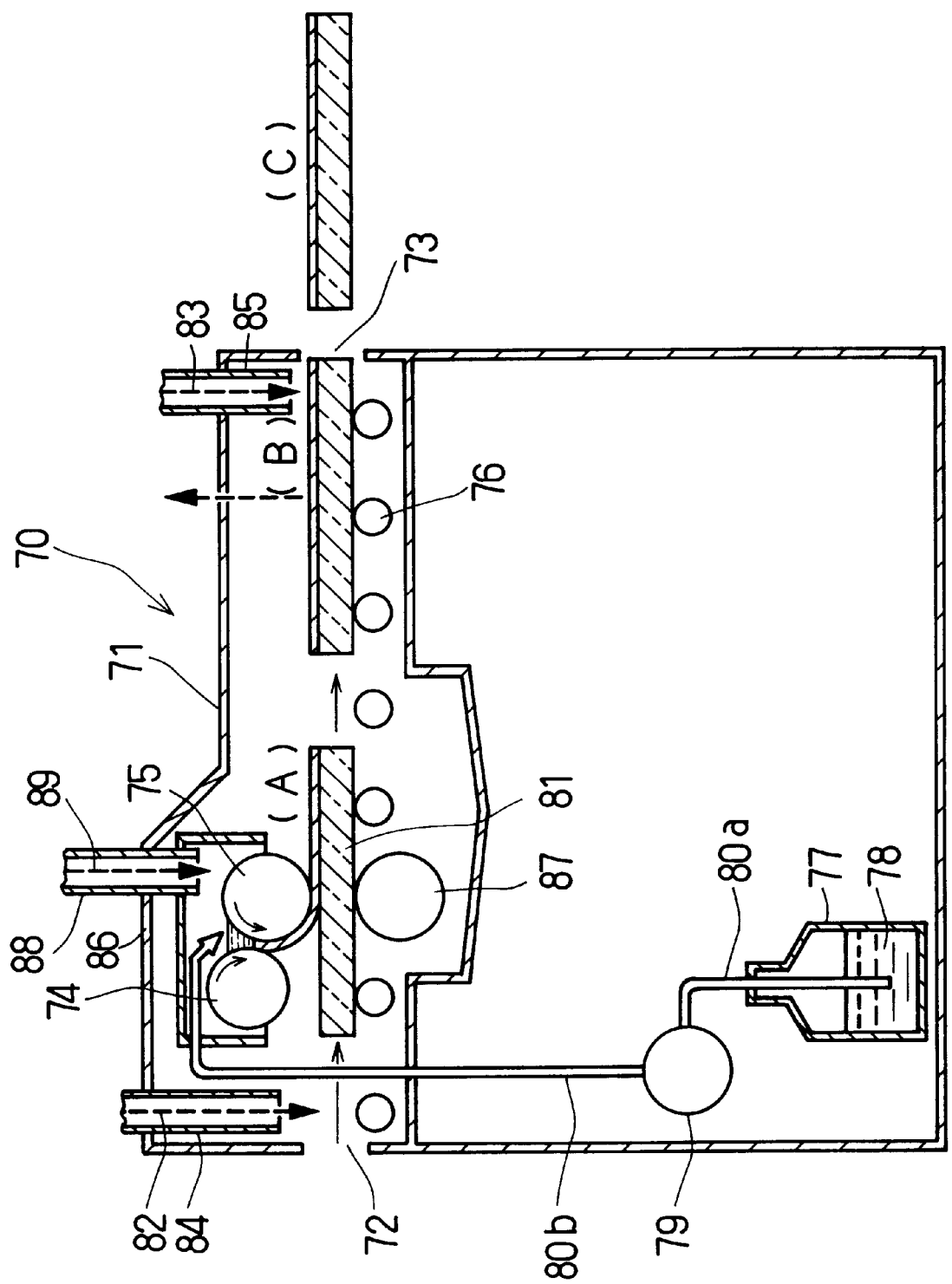
FIG. 7 is a schematic view of a roller coat film-forming apparatus of an apparatus for producing a molecular film of another example according to the present invention.

FIG. 7 is a schematic view showing the structure of a roller coater as one apparatus for producing a film employing a transfer method. A chamber 71 in this roller coater 70 includes an inlet 72 and an outlet 73 through which a substrate 81 is introduced and withdrawn, respectively, and includes components such as a doctor roll 74, a coating roll 75 and a backup roll 87 therein. The substrate introduced from the inlet 72 is transported by a transporting member such as a roll 76 or the like, so as to pass through the coating roll 75 and exit from the outlet 73. A container 77 contains a solution 78 containing silane-based compounds to be coated on the substrate. The solution 78 is drawn by a pipe 80a provided with a pump 79, and supplied through a pipe 80b to the contact area between the outer faces of the doctor roll 74 and the coating roll 75. A gas (preferably, a dry nitrogen gas or dry air) having a low water vapor density is supplied to the inlet 72 and the outlet 73, as shown by 82 and 83 in FIG. 7, so as to form air curtains 84 and 85. Furthermore, a cover 86 for covering the upper portions of the doctor roll 74 and the coating roll 75 (an inner chamber) is provided, and a gas (preferably, a dry nitrogen gas or dry air) having a low water vapor density 89 is supplied from a pipe 88 to the inner chamber, so that the atmosphere surrounding the doctor roll and the coating roll is maintained at a low humidity, preferably a water vapor density of 0.0076 kg/m³ or less (corresponding to a relative water vapor density of 35% or less at 25° C.). Although the apparatus looks sealed except for the inlet and the outlet in FIG. 7, a suitable ventilation path for discharging a solvent or the like is provided.

In the roller coater, the coating roll 75 is in contact with or pressed onto the doctor roll 74, and the solution containing a silane-based compound is supplied to this contact area. By rotating the coating roll 75, the solution is attached to the outer cylindrical face of the coating roll 75. Furthermore, the coating roll 75 is rotated in contact with or pressed onto the surface of the substrate 81, so that the surface of the substrate 81 can be coated with the solution uniformly. Since the atmosphere inside the apparatus is maintained at a low water vapor density, the silane-based compounds coated on the substrate are prevented from reacting with moisture before the dehydrochlorination reaction.

As described above, according to the present invention, while supplying a solution containing at least a silane-based compound to the outer cylindrical face of the coating roll of the roller coater at the atmosphere of a low water vapor density, the coating roll is rotated in contact with or pressed onto the surface of the substrate, so that the surface of the substrate is coated with the solution (shown in (A) in FIG. 7). At this time, the silane-based compounds and the hydroxyl groups on the surface effect the condensation reaction, and form covalent bonds, as shown in Formula 1 below.

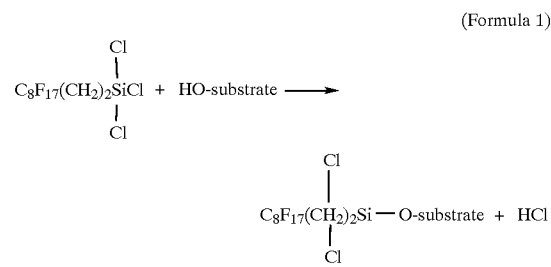

(Formula 1)

Thereafter, the substrate is dried at the atmosphere with a low water vapor density maintained inside the roller coater, and the coated solution comprising the solvent and any silane-based compounds not bonded to the hydroxyl groups on the substrate evaporates so as to be removed (shown in (B) in FIG. 7). Thus, only the silane-based compounds covalently bonded to the surface of the substrate remain on the substrate. Furthermore, when this substrate is contacted with the atmosphere containing moisture outside the roller coater, hydrolysis is effected as in the manner shown in Formula 2 below:

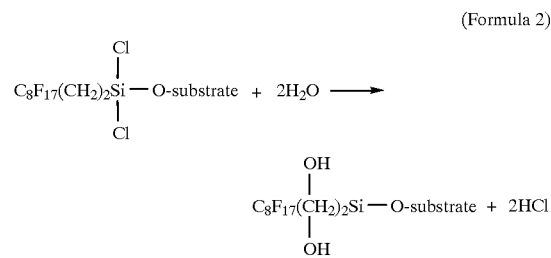

(Formula 2)

Next, when the substrate is dried under a dry atmosphere (shown in (C) in FIG. 7), the condensation reaction is effected among the silane-based compounds, as shown in Formula 3 below, so that a film is formed of covalent bonds to the surface of the substrate via siloxane bonds.

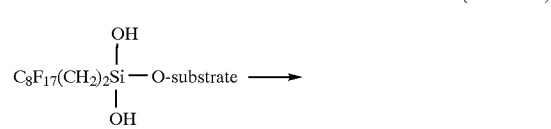

(Formula 3)

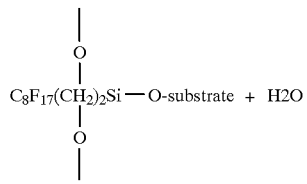

The process shown in (B) in FIG. 7 can be carried out outside the chamber 71.

A film having siloxane bonds is produced using the above-mentioned apparatus. More specifically, the coating roll 75 and the doctor roll 74 are formed of isobutylene-isoprene rubber. For the silane-based compound, fluoroalkyltrichlorosilane expressed by a formula $C_8F_{17}(CH_2)_2SiCl_3$ is used. For the solvent, octamethyl-cyclotetrasiloxane, which is nonaqueous, is used, so that a 1 vol. % solution of the silane is prepared. In order to maintain the atmosphere surrounding the coating roll 75 and the doctor roll 74 and the atmosphere inside the roller coater 70 at a low water vapor density, a nitrogen gas having a water vapor density 0.03 kg/m$^3$ or less is supplied.

A float glass as the substrate 81 is introduced to the roller coater with one face facing up so that a film of the silane-based compounds can be formed on the upper face. The lower face of the float glass is covered with a cover film made of polyethylene terephthalate so as not to be in contact with the silane-based compounds. When the glass substrate is introduced into the chamber, the surface of the float glass is coated with the solution uniformly to a thickness of about 0.5 to 1 μm at room temperature by adjusting the extent of pressing the coating roll 75 to the doctor roll 74 and the substrate 81. Thereafter, the float glass is dried with a nitrogen gas having a water vapor density 0.03 kg/m$^3$ or less at the position shown by (B) in FIG. 7. Furthermore, the float glass is taken out from the chamber, and dried in the atmosphere containing moisture. Under the presence of the moisture, the condensation reaction is effected among the silane-based compounds coated on the float glass, so that a film is formed on the surface of the substrate as a result of covalent bonds via the siloxane bonds. Thereafter, the cover film covering the lower face of the substrate is removed. This float glass is advantageously used as a laminated glass, which can be formed by attaching the float glasses with the faces having covalent bonds of the residues of the silane-based compounds, which repel water and oil, outward, and the faces masked with the cover film inward.

As described above, the method for forming a film according to the present invention makes it possible to form a film on the flat substrate, to improve the productivity significantly and thus to reduce the production cost significantly, compared with the conventional dip method. Thus, the industrial value thereof is great.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for forming a molecular film comprising the steps of: coating a surface of a substrate having active hydrogen atoms on its surface with a coating solution containing a silane-based compound having at least one reactive group selected from the group consisting of a chloro group, an alkoxy group and an isocyanate group; and effecting an elimination reaction between the active hydrogen atoms on the surface of the substrate and reactive groups of the silane-based compound, thereby covalently bonding the silane-based compounds to the surface of the substrate, wherein the substrate is supplied to a chamber in which an atmosphere is maintained at a water vapor density in the range of 0 to 0.0076 kg/m$^3$, the surface of the substrate is coated with a coating solution containing the silane-based compound and a solvent by using a transfer element, an elimination reaction is effected between the active hydrogen atoms and the reactive groups of the silane-based compounds, and thereafter, any coating solution containing unreacted silane-based compounds after coating is removed.

2. The method for forming a molecular film according to claim 1, wherein the transfer element comprises an inner chamber enclosing at least a portion where a coating solution is present on the transfer element.

3. The method for forming a molecular film according to claim 1, wherein air curtains for shutting off outside air are provided at an inlet and an outlet of the chamber through which the substrate is introduced and withdrawn, respectively.

4. The method for forming a molecular film according to claim 1, wherein the transfer element performs at least the steps of applying the coating solution to a support, and transferring the solution applied to the support to the substrate on which a film is to be formed.

5. A The method for forming a molecular film according to claim 1, wherein the transfer element is a roller coating element.

6. The method for forming a molecular film according to claim 1, wherein the silane-based compound comprises an alkyl group or a fluoroalkyl group.

7. The method for forming a molecular film according to claim 1, wherein the solvent contains no active hydrogen atoms.

8. The method for forming a molecular film according to claim 7, wherein the solvent containing no active hydrogen atoms is at least one selected from the group consisting of a hydrocarbon compound, a siloxane-based compound and hydrocarbon halide.

9. The method for forming a molecular film according to claim 1, wherein a mixing ratio of the silane-based compound to the solvent in the coating solution is such that the silane-based compound is present at an amount of 0.05 to 20% by weight, and the kinematic viscosity of the coating solution is 0.5 to 5000 cst (at 25° C.).

10. The method for forming a molecular film according to claim 1, wherein the substrate is a glass sheet, and a face other than a face which is to be coated with the coating solution is masked with a resin film prior to coating.

* * * * *